United States Patent [19]

Gose et al.

[11] Patent Number: 5,190,579

[45] Date of Patent: Mar. 2, 1993

[54] AQUEOUS ADDITIVE SYSTEMS, METHODS AND POLYMERIC PARTICLES

[75] Inventors: William C. Gose; Kenneth W. Hyche, both of Kingsport, Tenn.

[73] Assignee: Eastman Kodak Company, Rochester, N.Y.

[21] Appl. No.: 476,071

[22] Filed: Feb. 7, 1990

Related U.S. Application Data

[63] Continuation-in-part of Ser. No. 240,903, Sep. 6, 1988, Pat. No. 5,007,961, which is a continuation-in-part of Ser. No. 197,946, May 24, 1988, Pat. No. 4,975,120, which is a continuation-in-part of Ser. No. 827,042, Feb. 7, 1986, Pat. No. 4,898,616, which is a continuation-in-part of Ser. No. 701,888, Feb. 15, 1985, abandoned.

[51] Int. Cl.$^5$ .................... C08L 91/06; C08D 191/06; C08D 191/08
[52] U.S. Cl. .................... 106/18; 106/18.11; 106/18.12; 106/18.21; 106/18.24; 106/18.26; 106/18.28; 106/18.29; 106/271; 524/276; 524/277; 524/487
[58] Field of Search ............ 106/271, 272, 18, 18.11, 106/18.12, 18.21, 18.24, 18.26, 18.28, 18.29, 271; 524/276, 277, 484

[56] References Cited

U.S. PATENT DOCUMENTS

| | | | |
|---|---|---|---|
| 2,374,414 | 4/1945 | Cartwright | 106/271 |
| 4,264,320 | 4/1981 | White | 106/18.21 |
| 4,277,355 | 7/1981 | Farcnik | 106/18.29 |
| 4,788,008 | 11/1988 | Newbert | 106/18.24 |
| 4,849,134 | 7/1989 | Georlette et al. | 106/18.24 |
| 4,898,616 | 2/1990 | Hyche et al. | 106/271 |
| 4,975,120 | 12/1990 | Hyche et al. | 106/271 |
| 5,007,961 | 4/1991 | Hyche et al. | 106/271 |

FOREIGN PATENT DOCUMENTS 1455193 10/1966 France.
WO86/04909 8/1986 World Int. Prop. O.

OTHER PUBLICATIONS

Research Disclosure, No. 162, pp. 80-81, Disclosure No. 16268, published anonymously in English in Oct. 1977, Industrial Opportunities Ltd., Homewell, Havant, Hampshire PO91EF (GB).

Primary Examiner—Jacob Ziegler
Attorney, Agent, or Firm—Mark A. Montgomery; William P. Heath, Jr.

[57] ABSTRACT

Aqueous application systems for applying additives to polymeric particles, methods of preparing aqueous emulsions which include at least one processing, stabilizing or other functional polymer additive and an emulsifiable wax. Also disclosed are methods of applying additives to polymeric particles and to polymeric particles treated by such methods.

4 Claims, No Drawings

AQUEOUS ADDITIVE SYSTEMS, METHODS AND POLYMERIC PARTICLES

This application is a continuation-in-part of application Ser. No. 240,903 filed Sep. 6, 1988 now U.S. Pat. No. 5,007,961, which is a continuation-in-part of application Ser. No. 197,946 filed May 24, 1988 now U.S. Pat. No. 4,975,120; which is a continuation-in-part of application Ser. No. 827,042 filed Feb. 7, 1986 now U.S. Pat. No. 4,898,616, which is a continuation-in-part of application Ser. No. 701,888 filed Feb. 15, 1985 now abandoned, all of which are hereby incorporated by reference in their entirety.

TECHNICAL FIELD

This invention relates to aqueous application systems for applying additives to polymeric particles and methods of preparing aqueous emulsions which include additives having a high melting point, additives which have a low melting point and an emulsifiable wax. The invention further relates to methods of applying additives to polymeric particles and to polymeric particles treated by such methods.

BACKGROUND OF THE INVENTION

Known methods of introducing additives to polymeric particles include dry blending the materials, melting, and compounding the melted blend with extruders and pelletizing or powdering to the desired physical form. The additives employed to treat polymeric particles include antioxidants, processing aids, slip agents, antiblocking agents, antistatic agents, lubricants, UV stabilizers, coupling agents and colorants.

Another method of introducing additives to polymeric particles is to contact such particles with additive at the extruder hopper during end use processing. Additives such as colorants, slip agents, processing aids, blowing agents, and others are introduced to virgin polymeric particles at this stage usually in concentrate form. In many instances, difficulty is encountered in metering the exact amounts of additive concentrate necessary to do a specific job. This is especially true for additives such as processing aids and external lubricants which are used at very low levels and usually cannot be added in a concentrate form.

Some polymers are presently being manufactured with technology that does not lend itself to such techniques as melt compounding and pelletizing. Many polymers such as high density polyethylene, linear low density polyethylene, and polypropylene emerge from the polymerization reactor in a dry granular form, i.e., in a form similar to that of a fluidized bed system. Presently, additives for these polymers must be introduced by melting, compounding, and then pelletizing. This extra step increases the cost of such polymer manufacturing operations and can adversely effect the properties of such polymers.

SUMMARY OF THE INVENTION

In accordance with the present invention, a wide range of additives, such as antioxidants or thermal stabilizers, colorants or the like can be incorporated into the aqueous emulsified or dispersed systems of this invention. The aqueous emulsions or dispersions can be used to coat the polymeric particles before normal drying or degasing operations employing a variety of techniques such as, for example employing a spray, wipe, or dip system. Such aqueous systems may be formulated to treat polymeric particles which can then be formed into materials made from such particles. The resulting materials may be used in applications such as film or packaging for food, medicine and the like. Also, such aqueous systems may contain lubricants, mold release agents, antistatic agents and the like.

Polymers which emerge from the polymerization reactor in particle form would substantially benefit from the application of such aqueous emulsions containing antioxidants and other additives by means of such an aqueous treatment. This means of introducing additives would eliminate melt compounding, lower production energy requirements, and minimize heat history on the polymer particles.

DETAILED DESCRIPTION OF THE INVENTION

The present invention concerns aqueous application systems for applying a variety of additives to polymeric particles, the resulting system being characterized by freedom from in situ formation of color producing complexes. The invention application systems comprise:
 a) an emulsified wax,
 b) in the range of 0.025 up to 60 parts by weight of surfactant per part of emulsified wax,
 c) in the range of 0.0005 up to 2 parts by weight of a base with a pH in the range of greater than 7 to equal to or less than about 12,
 d) in the range of 0.05 up to 160 parts by weight of at least one processing, stabilizing or other functional polymer additive, and
 e) at least enough water to render the resulting combination fluid.

Preferred application systems of the present invention comprise:
 a) emulsified wax,
 b) in the range of about 0.025 up to 4.2 parts of surfactant,
 c) in the range of about 0.0005 up to 0.2 parts base,
 d) in the range of about 0.05 up to 60 parts additive(s), and
 e) sufficient water to render the resulting combination free-flowing.

In accordance with a particular preferred embodiment of the present invention, there are provided relatively concentrated application systems which comprise in the range of about 2 up to about 30 percent by weight of surfactant, in the range of about 5 up to about 20 percent by weight of emulsified wax, in the range of about 0.2 up to about 1.0 percent by weight of base, about 30 to about 80 percent by weight of additive, and at least 5, but less than about 40 percent by weight of water.

In accordance with another particularly preferred embodiment of the present invention, there are provided relatively high water content application systems which comprise in the range of about 0.1 up to 5 percent by weight of surfactant, in the range of about 0.5 up to 10 percent by weight of emulsified wax, in the range of about 0.02 up to 0.5 percent by weight of base, about 2 up to 23.5 percent by weight of additive, and greater than at least 60 up to about 97 percent by weight of water.

The base employed in the practice of the present invention may be selected from alkali metal salts of weak acids, e.g., sodium tetraborate, sodium carbonate, sodium bicarbonate, potassium hydroxide; alkaline earth salts of weak acids, e.g., calcium carbonate or magnesium carbonate, and the like.

The additives employed in the practice of the present invention may be selected from antioxidants, e.g , tetrakis[methylene 3-(3',5'-di-tert-butyl-4'-hydroxyphenyl)-propionate]methane, octadecyl 3-(3',5'-di-t-butyl-4-hydroxyphenyl)propionate, 1,3,5-trimethyl-2,4,6-tris-(3,5-di-tert-butyl)-4-(hydroxybenzyl)benzene, bis(2,4-di-t-butyl-phenyl) pentaerythritol diphosphite, tris(mono nonylphenyl)phosphite, 4,4'-butylidene-bis(5-methyl-2-t-butyl)phenol, tris(3,5-di-t-butyl-4-hydroxybenzyl)isocyanurate, tris-nonylphenyl phosphite; distearyl pentaerythritol diphosphite; tetrakis-(2,4-di-t-butylphenyl)-4,4'-biphenylylene-diphosphonite; tris-(2,3-di-t-butylphenyl) phosphite; butylated hydroxy toluene; dicetyl thiodipropionate; dimyristyl thiodipropionate; poly (1,4-cyclohexylenedimethylene-3,3'-thiodipropionate (partially terminated with stearyl alcohol); and the like; coupling agents, e.g., silanes; titanates; chromium complexes; low molecular weight polyolefins (with carboxylic moieties); high molecular weight polyolefins and acrylates (with carboxylic moieties); chlorinated paraffins; and the like; antistatic agents, e.g., glycerol monostearates; ethoxylated amines; polyethylene glycol; quaternary ammonium compounds (salts); and the like; nucleating agents, e.g., sodium benzoate; diphenyl phosphinic acid (including magnesium, sodium, calcium, aluminum salts); phenyl phosphinic acid (including salts); phenyl phosphorous acid (including salts); and the like; metal deactivators, e.g., oxalyl bis(benzylidene hydrazide); 2,2'-oxamido bis-(ethyl 3-(3,5-di-t-butyl-4-hydroxyphenyl) propionate; and the like; lubricants/slip agents/antiblocking agents, e.g., diatomaceous silica (earth); talc; clay; metallic stearates; alkyl bis-stearamids; glycerol monostearates; polyethylene glycol; erucamid; oleamid, and the like; UV inhibitors, e.g., 2-hydroxy-4-octoxybenzophenone; 2-hydroxy-4-isooctoxybenzophenone; 4-hydroxy-4-n-dodecyloxybenzophenone; 2-(3-di-t-butyl-2-hydroxy-5-methylphenyl5-chlorobenzotriazole; 2-(2-hydroxy-3,5-di-tamylphenyl) benzotriazole; p-t-butylphenyl salicyllate; 2,4-di-t-butylphenyl-3,5-di-t-buty14-hydroxybenzoate; nickel bis-ortho-ethyl(3,5-dit-butyl-4-hydroxybenzyl) phosphonate; 2,2',6,6'tetramethyl-4-piperidinyl sebacate, and the like; flame retardants, e.g., decabromodiphenyl oxide; dodecachlorodimethane dibenzocyclooctane; ethylene bis-dibromo norbornane dicarboximide; ethylene bis-tetrabromophthalimide; antimony trioxide, and the like; biocides, e.g., methyl paraben, ethyl paraben, propyl paraben, halogenated alkyl organic compounds, transition metal carbamate salts, and the like; as well as mixtures of any two or more of the above mentioned classes of compounds, or mixtures of two or more compounds from within a given class of compound.

The aqueous application systems of the present invention can be prepared by first agitating a combination comprising in the range of about 5 up to 35 wt. % emulsifiable wax, in the range of about 0.2 up to 1.0 wt. % base, in the range of about 2 up to 30 wt. % surfactant and in the range of 20 up to 80 wt. % water in a pressure vessel at a temperature sufficient to melt all solids and at a pressure sufficient to prevent boiling of the vessel contents for a time in the range of about 0.1 up to 6 hours. Once all solids have been melted and the mixture thoroughly combined, the vessel contents are rapidly cooled to room temperature.

The resulting emulsion (20-70 wt. %), the additive(s) to be incorporated into the invention application system (30-80 wt. %), optionally, additional water (0-35 wt. %) and, optionally, antifoam agent (0-1%) are all charged to a ball mill, sand mill, hammer mill, or the like with the resulting combination then being subjected to milling for a time in the range of about 2 up to 24 hours. The emulsion/dispersion obtained from this milling procedure is then ready for application to polymer particles as described hereinafter in greater detail.

Prior to use for application to polymer particles, the emulsion/dispersion prepared as described above can optionally be diluted with additional quantities of water, if desired. Such dilution may be carried out, for example, to improve the ease of application of the emulsion/dispersion to polymer particles, and to make it easy to vary the quantity of additive applied to the polymer particles.

The invention also includes methods of applying a wide range of additives to polymeric particles, the method comprising contacting the particles with emulsions/suspensions disclosed herein and subsequently drying the particles to leave the solids adhering to the particles.

The invention further includes polymeric particles prepared by the methods disclosed in this specification.

Aqueous emulsions or dispersions containing potassium hydroxide or sodium hydroxide, and additives such as processing aids, stabilizers or other functional additives for polymer particles, may cause the formation of color complexes when certain additives are present, such as n-octadecyl 3-(3',5'-di-tert-butyl-4'-hydroxyphenyl) propionate, a hindered phenolic primary antioxidant. This color complex formation imparts undesirable color to the polymeric particles to which the aqueous emulsions or dispersions are applied.

However, when such aqueous emulsions or dispersions contain sodium tetraborate, sodium carbonate, calcium carbonate, or magnesium carbonate, or a similar base component in the pH range of greater than about 7 to less than about 12, color complex formation is not observed. Such emulsions or dispersions containing a base such as sodium tetraborate can also contain additives such as stabilizer, for example, n-octadecyl 3-(3',5'-ditert-butyl-4'-hydroxyphenyl) propionate, without imparting color to the polymeric particles to which the aqueous emulsions or dispersions containing the additives are applied. The addition level of sodium tetraborate or a similar weak base to the aqueous emulsions or dispersions may vary from 0.2-1.0% by weight.

The aqueous emulsions or dispersions of this invention contain in addition to water, an emulsifiable wax, and one or more of a variety of the desired additives, stabilizers, colorants and the like.

The emulsifiable wax employed in the practice of the present invention may be any wax which can be readily emulsified, for example, emulsifiable polyolefin waxes such as oxidized polyolefin waxes or modified polyolefin waxes. Preferred oxidized polyolefin waxes include waxes having a density in the range of about 0.92-0.96, melt viscosities in the range of about 50-4,000 cp at 125° C. and an acid number in the range of about 12-55. Exemplary waxes include an oxidized polyethylene wax having a density of 0.939, a melt viscosity of 250 cp at 125° C. and an acid number of 16; an oxidized polyethylene wax having a density of 0.942, a melt viscosity of 900 cp at 125° C. and an acid number of 15; an oxidized polyethylene wax having a density of 0.955, a melt viscosity of 250 cp at 125° C. and an acid number of 16; and a maleated polypropylene wax having a density of 0.934, a melt viscosity of 400 cp at 190° C. and an acid number of 47.

The aqueous emulsions/dispersions prepared in accordance with the present invention may contain a variety of emulsifiable waxes, e.g., an emulsifiable polyethylene wax having a density of 0.939, a melt viscosity of 250 cp at 125° C. and an acid number of 16. Such emulsions may also contain surfactants and emulsifiers such as commercially available Tergitol 15-S-15 (an ethoxylated linear alcohol having a hydrophylic-lipophilic balance of 15.4, as determined according to Griffin, W. C., Office. Dig. Federation Paint Varnish Prod. Blubs, 28, 446 (1956)), and anti-foam agents such as SWS-211 (a mixture of food grade emulsifiers, 10% by wt. silicone compounds, and water). Such emulsions may also contain potassium hydroxide, sodium tetraborate, sodium carbonate, sodium bicarbonate, calcium carbonate or magnesium carbonate, morpholine, 2-amino-2-methylpropanol, tall oil fatty acid, ethylene glycol and ethoxylated stearyl alcohol (commercially available as Industrol A99), and the like.

Additives employed in the practice of the present invention include such materials as antioxidants, including, for example, hindered phenols, thioesters, organophosphites, and hindered amines, which may readily be dispersed or emulsified in the aqueous emulsion system. Additional additives contemplated by the present invention include coupling agents, antistatic agents, nucleating agents, metal deactivators, lubricants, slip agents, antiblocking agents, uv inhibitors, flame retardants and the like.

Examples of suitable polymer particles that can be benefited from the present invention include particles made from polyolefins including polypropylenes such as crystalline polypropylene, and polyethylenes such as low density polyethylene, high density polyethylene and linear low density polyethylene; olefin copolymers including ethylene copolymers and propylene copolymers such as crystalline propylene-ethylene copolymers and rubbers such as ethylene-propylene rubber and the like; polystyrene; polyesters and copolyesters such as polyethylene terephthalate, polybutylene terephthalate and the like; polyamides; polyimides; polyacetals; polycarbonates; polyvinyl chloride polymers and copolymers; polyaromatic sulfones; polyaromatic ketones; chlorosulfonated polyethylene; ethylenepropylene terpolymers; butyl rubbers; butadiene-styrene rubbers; silicone acrylonitrile rubbers; polyvinylidene chloride; acrylonitrile-butadiene-styrene; polycaprolactone; poly(ethylene oxide); chlorinated polyethylene; polymethyl methacrylate; and the like.

Some preferred polymeric particles that can benefit from the present invention include particles made from polyolefins such as crystalline polypropylene, low density polyethylene, high density polyethylene, and linear low density polyethylene; propylene-ethylene copolymers; polyvinyl chloride polymers and copolymers; polystyrene; polyimides; polyamides; and acrylonitrilebutadiene-styrene. The most preferred particles are made from ethylene and propylene polymers and copolymers, and acrylonitrile-butadiene-styrene.

The present invention provides polymeric particles which are stabilized in a unique and efficient manner and which are free from undesirable color.

The invention will be further illustrated by the following examples although it will be understood that these examples are included merely for purposes of illustration and are not intended to limit the scope of the invention.

EXAMPLE 1

The emulsions used in the following examples are prepared as follows: The components of the emulsion including an emulsifiable wax, a base, a surfactant, and an additive and sufficient water for a solids content of about 60 to 80% are mixed in a glass-lined pressure vessel. While agitating the mixture, the temperature is raised, under pressure to prevent boiling, to a point sufficient to melt all solids and is maintained for a time period sufficient to ensure that the solids are melted (usually about 30 minutes). After this heating period while maintaining the pressure, hot water (85°-100° C.) is added in an amount sufficient to give a final solids content of about 25-60%. The emulsion is then reheated to the previous temperature and held at a pressure sufficient to prevent boiling at this temperature for a period of time to ensure homogeneity (usually about 10 minutes) followed by rapid cooling to ambient temperature (23° C.).

EXAMPLE 2

The following emulsion components were added to a pressure vessel: 32.3 parts by wt. of octadecyl 3-(3',5'-di-t-butyl-4-hydroxyphenyl)propionate, 10.8 parts by weight of oxidized polyethylene emulsifiable wax, 0.5 parts of KOH as base, 6.4 parts of surfactant (Tergitol 15-S-15) and sufficient water was added to bring the content of the mixture at this stage to about 70% solids. The emulsion was then prepared according to the procedure in Example 1 with the final water addition being sufficient to make the total water content equal to 50% by wt. of the mixture and the solids content of the mixture to 32% by wt. of octadecyl 3-(3',5'-di-t-butyl-4-hydroxyphenyl)propionate in the total mixture. The resulting emulsion was applied to pellets of polypropylene having a density of 0.902 and a melt flow rate of 9. The amount of emulsion used was calculated to achieve a solids level of 0.3-0.5% solids by weight on the coated polypropylene pellets. The coated polypropylene pellets became a light yellow-green in color following air drying.

EXAMPLE 3

The following emulsion components were added to a pressure vessel: 32.3 parts by wt. of octadecyl 3-(3',5'-di-t-butyl-4-hydroxyphenyl)propionate, 10.8 parts by wt. of oxidized polyethylene emulsifiable wax, 0.5 parts of sodium tetraborate as base, 6.4 parts of surfactant (Tergitol 15-S-15) and sufficient water was added to bring the content of the mixture at this stage to about 70% solids. The emulsion was then prepared according to the procedure in Example 1 with the final water addition being sufficient to make the total water content equal to 50% by wt. of the mixture and the solids content of the mixture to 32% by wt. of octadecyl 3-(3',5'-di-t-butyl-4hydroxyphenyl)propionate in the total mixture. The resulting emulsion was applied to pellets of polypropylene having a density of 0.902 and a melt flow rate of 9. The amount of emulsion used was calculated to achieve a solids level of 0.3-0.5% solids by weight on the coated polypropylene pellets. The coated polypropylene pellets did not exhibit a color shift from the original white color following air drying.

EXAMPLE 4

The following emulsion components were added to a pressure vessel: 30% by wt. of an emulsifiable wax, 9% by wt. of surfactant (Tergitol 15-S-15), 0.75% by wt. of KOH, 0.25% by wt. of sodium meta-bisulfite and sufficient water to bring the total solids content to 40%. While agitating the mixture under pressure to prevent boiling, the temperature was raised to a point sufficient to melt all solids and was maintained for thirty minutes to ensure that the solids were melted and was then rapidly cooled to ambient temperature. 25% by wt. of the resultant emulsion was added to a one-gallon Ball-Mill, then 50% by wt. of 1,3,5-trimethyl-2,4,6-tris(3,5-di-t-butyl)-4-hydroxybenzyl)benzene, 24.9% by wt. of additional water and 0.1% by wt. of an antifoaming agent (SWS 211) was added and the resultant mixture was ball milled for 16 hours. The final solids content of 1,3,5-trimethyl-2,4,6-tris(3,5-dit-butyl)-4-hydroxy-benzyl)benzene was 50% by wt. of the total mixture. The resultant emulsion/dispersion was applied to pellets of polypropylene having a density of 0.902 and a melt flow rate of 9. The amount of emulsion/dispersion used was calculated to achieve a solids level of 0.3-0.5% solids by weight on the coated polypropylene pellets. The coated polypropylene pellets became a light purple-violet in color following air drying.

EXAMPLE 5

An emulsion/dispersion prepared according to Example 4 and substituting sodium tetraborate for potassium hydroxide as base was applied to pellets of polypropylene having a density of 0.902 and a melt flow rate of 9. The amount of emulsion/dispersion used was calculated to achieve a solids level of 0.3-0.5% solids by weight on the coated polypropylene pellets. The coated polypropylene pellets did not exhibit a color shift from the original white color following air drying.

EXAMPLE 6

Comparative

The following components were added to a pressure vessel: 32.3 parts by wt. of tetrakis[methylene 3-(3',5'-di-t-butyl-4'-hydroxyphenyl)propionate]methane, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. An attempt was made to prepare an emulsion according to the procedure in Example 1. The final water addition was sufficient to make the total water content equal to 50% by wt. of the mixture and the final solids content of the mixture to 32% by wt. of tetrakis[methylene 3-(3',5'-di-t-butyl-4'-hydroxyphenyl)propionate]methane. The attempt to prepare the emulsion was unsuccessful due to the inability to coemulsify tetrakis[methylene-3',5'-di-t-butyl-4'-hydroxyphenyl)propionate]methane with the oxidized polyethylene emulsifiable wax.

EXAMPLE 7

The following emulsion components were added to a pressure vessel: 11 parts by wt. of tetrakis[methylene 3-(3'-5'-di-t-butyl-4'-hydroxyphenyl)propionate]methane, 21 parts by wt. of dilauryl thiodipropionate, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt. of the mixture and the solids content of the mixture to 32% by wt. of tetrakis[methylene 3-(3'-5'-di-t-butyl4'-hydroxyphenyl)propionate]methane and dilauryl thiodipropionate. A stable emulsion resulted.

EXAMPLE 8

The following emulsion components were added to a pressure vessel: 7.3 parts by wt. of tetrakis[methylene 3-(3'-5'-di-t-butyl-4'-hydroxyphenyl)propionate]methane, 21 parts by wt. of dilauryl thiodipropionate, 4 parts by wt. of bis(2,4-di-t-butylphenyl)pentaerythritol diphosphite, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt. of the mixture and the solids content of the mixture to 32% by wt. of tetrakis[methylene 3-(3'-5'-di-t-butyl-4'-hydroxyphenyl)propionate]methane and dilauryl thiodipropionate and bis(2,4-di-t-butylphenyl)pentaerythritol diphosphite in the total mixture. A stable emulsion resulted.

EXAMPLE 9

The following emulsion components were added to a pressure vessel: 32.3 parts by wt. of dilauryl thiodipropionate, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt. of the mixture and the final solids content of the mixture to 32% by wt. of dilauryl thiodipropionate in the total mixture. A stable emulsion resulted.

EXAMPLE 10

The following emulsion components were added to a pressure vessel: 9.6 parts by wt. of tetrakis[methylene 3-(3'-5'-di-t-butyl-4'-hydroxyphenyl)propionate]methane, 16 parts by wt. of dilauryl thiodipropionate, 6.4 parts by wt. of tris(monononylphenyl)phosphite, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt. of the mixture and the solids content of the mixture to 32% by wt. of tetrakis[methylene 3-(3'-5'-di-t-butyl-4'-hydroxyphenyl)propionate]methane and dilauryl thiodipropionate and tris(monononylphenyl)phosphite in the total mixture. A stable emulsion resulted.

EXAMPLE 11

The following emulsion components were added to a pressure vessel: 8 parts by wt. of tetrakis[methylene 3-(3',5'-di-t-butyl-4'-hydroxyphenyl)propionate]methane, 10.7 parts by wt. of tris-(monononylphenyl)phosphite, 8 parts by wt. dilauryl thiodipropionate, 13.2 parts by weight of oxidized polyethylene emulsifiable wax, 0.75 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt. of the mixture and the solids content of the mixture to 23% by wt. of tetrakis[methylene 3-(3',5'-di-t-butyl-4'-hydroxyphenyl)propionate]methane, tris(monononylphenyl)phosphite, and dilauryl thiodipropionate in the total mixture. A stable emulsion resulted.

EXAMPLE 12

The following emulsion components were added to a pressure vessel: 9 parts by wt. of tetrakis[methylene 3-(3',5'-di-t-butyl-4'-hydroxyphenyl)propionate]methane, 12 parts by wt. of tris(monononylphenyl)phosphite, 9 parts by wt. dilauryl thiodipropionate, 10 parts by weight of oxidized polyethylene emulsifiable wax, 0.75 parts of KOH as base, 6 parts of surfactant (Tergitol 15-S.15) and sufficient water to bring the solids content of the mixture at this stage to about 70% solids. The emulsion was then prepared according to the procedure in Example 1 with the final water addition being sufficient to make the total water content equal to 60% by wt. of the mixture and the solids content of the mixture to 26% by wt. of tetrakis[methylene 3-(3',5'-di-t-butyl-4'-hydroxyphenyl)propionate]methane, tris(monononylphenyl)phosphite, and dilauryl thiodipropionate in the total mixture. A stable emulsion resulted.

EXAMPLE 13

The following emulsion components were added to a pressure vessel: 9.6 parts by wt. of tetrakis[methylene 3-(3',5'-di-t-butyl-4'-hydroxyphenyl)propionate]methane, 12.8 parts by wt. of tris(monononylphenyl)phosphite, 9.6 parts by wt. dilauryl thiodipropionate, 8 parts by weight of oxidized polyethylene emulsifiable wax, 0.75 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt. of the mixture and the solids content of the mixture to 27% by wt. of tetrakis[methylene 3-(3',5'-di-t-butyl-4'-hydroxyphenyl)propionate]methane, tris(monononylphenyl)phosphite, and dilauryl thiodipropionate in the total mixture. A stable emulsion resulted.

EXAMPLE 14

The following emulsion components were added to a pressure vessel: 10.3 parts by wt. of tetrakis[methylene 3-(3',5'-di-t-butyl-4'-hydroxyphenyl)propionate]methane, 15.4 parts by wt. of tris(monononylphenyl)phosphite, 10.3 parts by wt. dilauryl thiodipropionate, 4 parts by weight of oxidized polyethylene emulsifiable wax, 0.75 parts of KOH as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt. of the mixture and the solids content of the mixture to 31% by wt. of tetrakis[methylene 3-(3',5'-di-t-butyl-4'-hydroxyphenyl)propionate]methane, tris(monononylphenyl)phosphite, and dilauryl thiodipropionate in the total mixture. A stable emulsion resulted.

EXAMPLE 15

Comparative

The following emulsion components were added to a pressure vessel: 8 parts by wt. of tetrakis[methylene 3-(3',5'-di-t-butyl-4,-hydroxyphenyl)propionate]methane, 18.8 parts by wt. dilauryl thiodipropionate, 13.2 parts by weight of oxidized polyethylene emulsifiable wax, 1.5 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient total water content equal to 69% by wt. of the mixture and the solids content of the mixture 17% by wt. of tetrakis[methylene 3-(3',5'-di-t-butyl-4'hydroxyphenyl)propionate]methane and dilauryl thiodipropionate in the total mixture. A poor quality emulsion resulted.

EXAMPLE 16

The following emulsion components were added to a pressure vessel: 8 parts by wt. of tetrakis[methylene 3-(3',5'-di-t-butyl-4'-hydroxyphenyl)propionate]methane, 18.8 parts by wt. dilauryl thiodipropionate, 13.2 parts by weight of oxidized polyethylene emulsifiable wax, 0.75 parts of KOH as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 69% by wt. of the mixture and the solids content of the mixture 17% by wt. of tetrakis[methylene 3-(3',5'di-t-butyl-4'-hydroxyphenyl)propionate]methane and dilauryl thiodipropionate in the total mixture. A stable emulsion resulted.

EXAMPLE 17

Comparative

The following emulsion components were added to a pressure vessel: 30 parts by wt. of octadecyl 3-(3',5'-di-t-butyl-4-hydroxyphenyl)propionate, 10 parts by weight of oxidized polyethylene emulsifiable wax, 0.2 parts of sodium tetraborate as base, 6 parts of surfactant (Tergitol 15-S.15) and sufficient water to bring the solids content of the mixture at this stage to about 70% solids. The emulsion was then prepared according to the procedure in Example 1 with the final water addition being sufficient to make the total water content equal to 50% by wt. of the mixture and the solids content of the mixture to 32.5% by wt. of octadecyl 3-(3',5'-di-t-butyl-4-hydroxyphenyl)propionate in the total mixture. A poor quality emulsion resulted.

EXAMPLE 18

The following emulsion components were added to a pressure vessel: 30 parts by wt. of octadecyl 3-(3',5'-di-t-butyl-4-hydroxyphenyl)propionate, 10 parts by weight of oxidized polyethylene emulsifiable wax, 0.4 parts of sodium tetraborate as base, 6 parts of surfactant (Tergitol 15-S-15) and sufficient water to bring the solids content of the mixture at this stage to about 70% solids. An aqueous emulsion was then prepared according to the procedure in Example 1 with the final water addition being sufficient to make the total water content equal to 50% by wt. of the mixture, and the solids content of the mixture 32.5% by wt. of octadecyl 3-(3',5'-di-t-butyl-4-hydroxyphenyl)propionate in the total mixture. A stable emulsion resulted.

EXAMPLE 19

The following emulsion components were added to a pressure vessel: 30 parts by wt. of octadecyl 3-(3',5'-di-t-butyl-4-hydroxyphenyl)propionate, 10 parts by weight of oxidized polyethylene emulsifiable wax, 0.8 parts of sodium tetraborate as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 50% by wt. of the mixture and the solids content of the mixture to 32.5% by wt. of octadecyl 3-(3',5'-dit-butyl-4-hydroxyphenyl)propionate in the total mixture. A stable emulsion resulted.

EXAMPLE 20

Comparative

Polypropylene pellets having a density of 0.906 and a melt flow rate of 4 were melt compounded with sufficient tetrakis[methylene 3-(3',5'-di-t-butyl4'-hydroxyphenyl)propionate]methane, tris(mononoylphenyl)phosphite, and dilauryl thiodipropionate to provide a stabilization level of 0.15%, 0.10%, and 0.25% by wt. respectively to the polypropylene. Following extrusion and pelletization, the stabilized polypropylene was oven aged at 150° C. to check oxidative stability. The polypropylene had not exhibited evidence of degradation after 49 days at 150° C.

EXAMPLE 21

The following emulsion components were added to a pressure vessel: 8 parts by wt. of tetrakis[methylene 3-(3',5'-di-t-butyl-4'-hydroxyphenyl)propionate]methane, 13.4 parts by wt. of dilauryl thiodipropionate, 5.4 parts by wt. of tris(mononoylphenyl)phosphite, 13.2 parts by wt. of oxidized polyethylene emulsifiable wax, 0.75 parts by wt. of KOH as base, 6 parts by wt. of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 50% by wt. of the mixture and the solids content of the mixture to about 17% by wt. of tetrakis[methylene 3-(3',5'-di-t-butyl-4'-hydroxyphenyl)propionate]methane, dilauryl thiodipropionate, and tris(mononoylphenyl)phosphite. A stable emulsion resulted.

EXAMPLE 22

The emulsion of Example 21 was applied to polypropylene pellets having a density of 0.906 and a melt flow rate of 4 in a manner calculated to coat the polypropylene with 0.15%, 0.25%, and 0.10% by wt., respectively, of tetrakis[methylene 3-(3',5'-di-t-butyl-4'-hydroxyphenyl)propionate]methane, dilauryl thiodipropionate, and tris(mononoylphenyl)phosphite. The coated polypropylene was oven aged at 150° C. to check oxidative stability. The polypropylene had not exhibited evidence of degradation after 49 days at 150° C. indicating that polypropylene stabilized with an aqueous emulsion of tetrakis[methylene 3-(3',5'-di-t-butyl-4'-hydroxyphenyl)propionate]methane, dilauryl thiodipropionate, and tris(mononoylphenyl)phosphite compares favorably with polypropylene stabilized with the same compounds at the same level as in Example 20.

EXAMPLE 23

An emulsion was prepared according to the procedure in Example 1 and using the ingredients in Example 4, and 25% by wt. of the emulsion was added to a 1-gallon Ball-Mill. Then 38.4% by wt. octadecyl 3-(3',5'-di-t-butyl-4-hydroxyphenyl) propionate, 24.2% by wt. 48% aqueous calcium stearate, 12% by wt. additional water, 0.2% by wt. of an antifoaming agent (SWS 211), and 0.1% by wt. each of methyl and propyl paraben (biocides) was added and the resultant mixture was ball milled for 16 hours. The final solids content of octadecyl 3-(3',5'-di-t-butyl-4hydroxyphenyl) propionate and calcium stearate was at a 10:3 wt. ratio (38.4:11.6 wt. %). The resultant emulsion/dispersion was applied to polypropylene pellets having a density of 0.902 and a melt flow rate of 9. The amount of emulsion/dispersion used was calculated to achieve a solids level of 0.1% solids by wt. on the coated polypropylene pellets. The coated polypropylene did not exhibit a color shift when dryed in an oven for 3 days at a temperature of 150° C.

EXAMPLE 24

An emulsion was prepared according to the procedure in Example 1 and using the ingredients in Example 4, and 26.3% by wt. of the emulsion was added to a 1-gallon Ball-Mill. Then 40% by wt. octadecyl 3-(3',5'-di-t-butyl-4-hydroxyphenyl) propionate, 26.3% by wt. 48% aqueous calcium stearate, 1.5% by wt. of surfactant (Igepal CO 630), 0.5% by wt. of surfactant (Igepal CO 210), 0.2% by wt. of an antifoaming agent (SWS 211), and 0.1% by wt. each of methyl and propyl paraben (biocides) was added and the resultant mixture was ball milled for 16 hours. The final solids content of octadecyl 3-(3',5'-dit-butyl-4-hydroxyphenyl) propionate and calcium stearate was at a 8:3 wt. ratio (40:12.6 wt. %). The resultant emulsion/dispersion was applied to polypropylene pellets having a density of 0.902 and a melt flow rate of 9. The amount of emulsion/dispersion used was calculated to achieve a solids level of 0.08% by wt. on the coated polypropylene pellets. The coated polypropylene pellets die not exhibit a color shift when dryed in an oven for 3 days at a temperature of 150° C.

The invention has been described in detail with particular reference to preferred embodiments thereof, but it will be understood that variations and modifications can be effected within the spirit and scope of the invention.

We claim:

1. Method of preparing aqueous emulsions which include an emulsifiable wax and at least one processing, stabilizing or other functional polymer additive component, said method comprising (1) agitating a mixture which contains by weight, about 20 to about 80 percent water, about 5 to about 35 percent of an emulsifiable wax, about 0.2 to about 1.0 percent of a base, and about 2 to about 30 percent of a surfactant; at a temperature sufficient to melt all solids; and under a pressure sufficient to prevent boiling for a period of time to ensure homogeneity;

(2) cooling said emulsion to ambient temperature; and (3) milling in the range of 20 up to 70 wt. % of the cooled emulsion with in the range of about 30 up to 80 wt. % of said additive(s) optionally with 0–35 wt. % water, and optionally with 0–1 wt. % antifoam for a period of time to ensure substantial homogeneity.

2. Method of claim 1 wherein said base has a pH in the range of greater than 7 to equal to or less than about 12.

3. Method of claim 2 wherein said base is selected from sodium tetraborate, sodium carbonate, sodium bicarbonate, calcium carbonate or magnesium carbonate.

4. Method of claim 2 wherein said additive component is selected from:
antioxidants,
coupling agents,
antistatic agents,
nucleating agents,
metal deactivators,
lubricants-slip/antiblocking agents,
UV inhibitors, or
flame retardants,
as well as mixtures of any two or more thereof.

* * * * *